United States Patent
Nakamura et al.

(10) Patent No.: US 10,596,954 B2
(45) Date of Patent: Mar. 24, 2020

(54) CONTROL DEVICE FOR VEHICULAR LAMP AND VEHICLE LIGHTING SYSTEM

(71) Applicant: Stanley Electric Co., Ltd., Tokyo (JP)

(72) Inventors: Shigekatsu Nakamura, Tokyo (JP); Yusuke Hirai, Tokyo (JP)

(73) Assignee: STANLEY ELECTREC CO., LTD., Tokyo (JP)

( * ) Notice: Subject to any disclaimer, the term of this patent is extended or adjusted under 35 U.S.C. 154(b) by 0 days.

(21) Appl. No.: 16/163,257

(22) Filed: Oct. 17, 2018

(65) Prior Publication Data

US 2019/0111829 A1 Apr. 18, 2019

(30) Foreign Application Priority Data

Oct. 17, 2017 (JP) .................................. 2017-201240

(51) Int. Cl.
 *B60Q 1/115* (2006.01)
 *B60W 40/11* (2012.01)

(52) U.S. Cl.
 CPC ........ *B60Q 1/115* (2013.01); *B60Q 2300/112* (2013.01); *B60Q 2300/114* (2013.01);
 (Continued)

(58) Field of Classification Search
 CPC .............. B60Q 1/115; B60Q 2300/116; B60Q 2300/112; B60Q 2300/132; B60Q 2300/114; B60W 40/11
 See application file for complete search history.

(56) References Cited

U.S. PATENT DOCUMENTS

| 10,300,839 B2* | 5/2019 | Nakamura | B60Q 1/115 |
| 2012/0101692 A1* | 4/2012 | Kasaba | B60Q 1/10 701/49 |

(Continued)

FOREIGN PATENT DOCUMENTS

| EP | 1681573 A1 | 7/2006 |
| EP | 2399774 A2 | 12/2011 |

(Continued)

OTHER PUBLICATIONS

The extended European Search Report for the related European Patent Application No. 18200861.5 dated Apr. 4, 2019.

*Primary Examiner* — Donald L Raleigh
(74) *Attorney, Agent, or Firm* — Kenealy Vaidya LLP

(57) ABSTRACT

To provide a technique capable of accurately obtaining the attitude of a vehicle in the pitch direction. A control device for a vehicular lamp which controls the optical axis of a vehicular lamp in accordance with an attitude change in pitch direction of the vehicle is disclosed. The device includes an angle calculation part which obtains a first and a second acceleration by eliminating the gravitational acceleration component from each acceleration in the vertical and the longitudinal direction of the vehicle, calculates a vehicle traveling direction acceleration based on the accelerations, and obtains a vehicle attitude angle based on the correlation between the vehicle traveling direction acceleration and the first and the second accelerations. The angle calculation part obtains the attitude angle of the vehicle when it determines that the vehicle is accelerating or decelerating based on the determination on the basis of each acceleration difference at the predetermined time.

21 Claims, 4 Drawing Sheets

(52) U.S. Cl.
CPC .. *B60Q 2300/116* (2013.01); *B60Q 2300/132* (2013.01); *B60W 40/11* (2013.01)

(56) References Cited

U.S. PATENT DOCUMENTS

| | | | | |
|---|---|---|---|---|
| 2012/0106179 | A1* | 5/2012 | Kasaba | B60Q 1/115 362/465 |
| 2015/0088455 | A1 | 3/2015 | Yamashita | |
| 2017/0129390 | A1* | 5/2017 | Akaza | B60Q 1/115 |
| 2018/0065539 | A1* | 3/2018 | Ohsawa | B60Q 1/115 |
| 2019/0092223 | A1* | 3/2019 | Buhmann | B60Q 1/10 |

FOREIGN PATENT DOCUMENTS

| | | | |
|---|---|---|---|
| EP | 2402212 | A2 | 1/2012 |
| JP | 5577080 | B2 | 8/2014 |
| JP | 5787649 | B2 | 9/2015 |

* cited by examiner

US 10,596,954 B2

CONTROL DEVICE FOR VEHICULAR LAMP AND VEHICLE LIGHTING SYSTEM

BACKGROUND OF THE INVENTION

Field of the Invention

The present invention relates to a technique for controlling light irradiation direction by a vehicular lamp (for example, a pair of lamp units) corresponding to an attitude change of a vehicle.

Description of the Background Art

Automatic leveling control for adjusting irradiation direction of light (or the optical axis) of headlamps corresponding to the attitude change of a vehicle in the pitch direction due to occupants or load is known. According to such automatic leveling control, it is possible to prevent glaring an oncoming vehicle or a preceding vehicle even when the attitude of the vehicle changes.

Prior art for achieving automatic leveling control in a moving vehicle is disclosed in Japanese Patent No. 5577080 (hereinafter referred to as Patent Document 1), for example. In the technique disclosed in Patent Document 1, angle of inclination is obtained by performing a predetermined calculation using acceleration values in the horizontal direction and the vertical direction of the vehicle obtained by a two-axis acceleration sensor installed in the vehicle, and the irradiation direction of the light is controlled based on the angle of inclination.

Further, in the technique disclosed in Japanese Patent No. 5787649 (hereinafter referred to as Patent Document 2), acceleration values in the horizontal direction of a vehicle obtained by an acceleration sensor installed in a vehicle is represented on the first axis, and acceleration values in the vertical direction is represented on the second axis, and plots the detected acceleration values in each direction on a coordinate plane thereby obtaining a straight line from each of the detected acceleration values, and controls the irradiation direction of light based on the gradient of the straight line.

The accelerations obtained by the acceleration sensor installed in the vehicle also includes gravitational acceleration components. However, in the above-described prior arts, since the gravitational acceleration components have not been fully taken into consideration, the adverse effect of the gravitational accelerations is likely to result in a low accuracy of the calculated angle of inclination.

In a specific aspect, it is an object of the present invention to provide a technique capable of obtaining the attitude of the vehicle in the pitch direction more accurately.

SUMMARY OF THE INVENTION

[1] A control device for a vehicular lamp according to one aspect of the present invention is a control device which variably controls optical axis of the vehicular lamp in accordance with an attitude change in the pitch direction of a vehicle including (a) an angle calculation part where the angle calculation part obtains acceleration values each associated with the vertical direction and the horizontal direction of the vehicle at a predetermined time interval, obtains a first acceleration value related to the vertical direction of the vehicle and a second acceleration value related to the horizontal direction of the vehicle by eliminating gravitational acceleration component from each of the acceleration values, calculates a vehicle traveling direction acceleration based on the first acceleration value and the second acceleration value, and further obtains an attitude angle of the vehicle based on a correlation between either one of the first acceleration value or the second acceleration value and the vehicle traveling direction acceleration, and (b) an optical axis setting part which generates a control signal for controlling the optical axis of the vehicular lamp based on the attitude angle of the vehicle obtained by the angle calculation part, and provides the control signal to the vehicular lamp, (c) wherein, before obtaining the attitude angle of the vehicle, the angle calculation part performs a first determination process that determines whether or not the vehicle is accelerating or decelerating by comparing either (i) the amount of change in one of each of the acceleration values at the predetermined time with the corresponding reference value, (ii) the amount of change in the combined value of each of the acceleration values at the predetermined time with the corresponding reference value, or (iii) the amount of change in the value obtained by eliminating the combined value of the gravitational acceleration component from the combined value of each of the acceleration values at a predetermined time, with a reference value corresponding to the selected amount of change, and obtains an attitude angle of the vehicle when the angle calculation part determines that the vehicle is accelerating or decelerating based on the first determination process.

[2] A vehicular lamp system according to one aspect of the present invention is a vehicular lamp system including the above-described control device and a vehicle lamp controlled by the control device.

According to the above configurations, the attitude of the vehicle in the pitch direction can be obtained more accurately.

DESCRIPTION OF THE PREFERRED EMBODIMENTS

Figure 1:
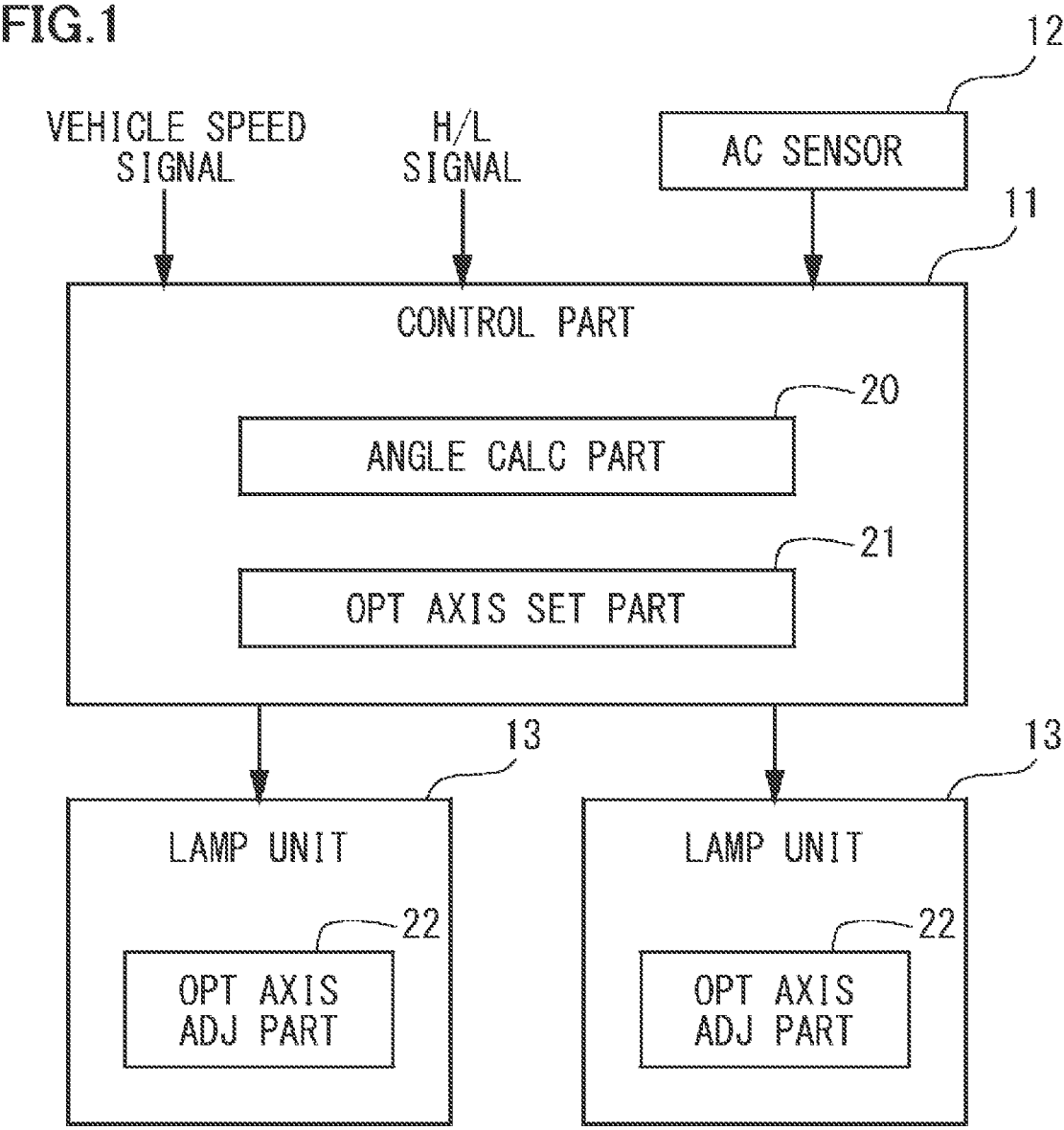
FIG. 1 is a block diagram showing a configuration of a vehicular lamp system according to one embodiment.
Figure 2:
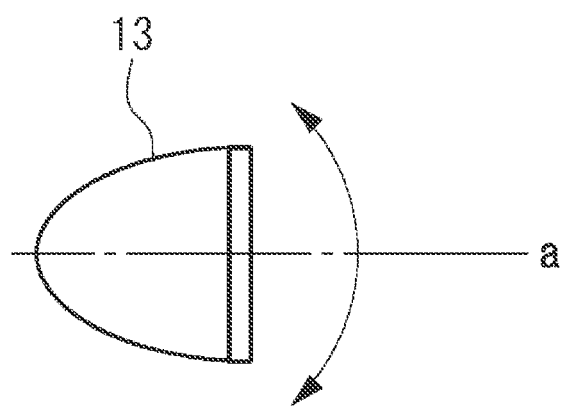
FIG. 2 is a figure schematically showing the state of optical axis control of the lamp unit.

FIG. 1 is a block diagram showing a configuration of a vehicular lamp system according to one embodiment. The vehicular lamp system shown in FIG. 1 includes a control part 11, an acceleration sensor 12 (abbreviated as AC SENSOR in FIG. 1), and two lamp units 13. As schematically shown in FIG. 2, this vehicular lamp system variably controls the light irradiation direction a (optical axis a) by each lamp unit 13 during vehicle travel in accordance with the attitude change of the vehicle in the pitch direction.

The control part 11 controls the operation of the vehicular lamp system, and is configured to include an angle calculation part 20 (abbreviated in FIG. 1 as ANGLE CALC PART) and an optical axis setting part 21 (abbreviated as OPT AXIS SET PART in FIG. 1). The control part 11 carries out a predetermined operation program in a computer system comprising a CPU, ROM, RAM, and the like, for example.

The acceleration sensor 12 is a sensor capable of detecting at least accelerations in the direction of two mutually orthogonal axes and is installed at a predetermined position in the vehicle. This acceleration sensor 12 is installed in the vehicle so that the axial direction of one axis matches the front-to-rear direction (the horizontal direction) of the vehicle and the axial direction of the other axis matches the up-and-down direction (the vertical direction) of the vehicle, for example.

Each of the lamp units 13 is installed at a predetermined position in the front portion of the vehicle, and is configured to have a light source, a reflecting mirror, and the like for irradiating the front of the vehicle with light. Each lamp unit 13 has an optical axis adjusting part 22 (abbreviated as OPT AXIS ADJ PART in FIG. 1) for adjusting the optical axis a up and down in the pitch direction of the vehicle. Each optical axis adjusting part 22 has, for example, an actuator for vertically adjusting the direction of the light source of each lamp unit 13, and operates based on a control signal provided from the control part 11.

Based on the vehicle speed signal obtained from a vehicle speed sensor installed in the vehicle which is not shown in the figure and the acceleration values obtained from the acceleration sensor 12, the angle calculation part 20 calculates an attitude angle (a vehicle angle) which is the information indicating the attitude in the pitch direction of the vehicle.

Based on the attitude angle calculated by the angle calculation part 20, the optical axis setting part 21 generates a control signal for controlling the optical axis a of each lamp unit 13, and provides the control signal to each lamp unit 13.

Figure 3A:
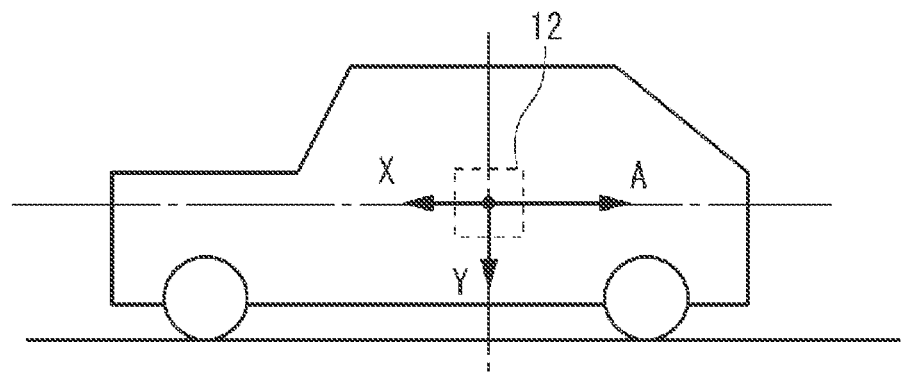
FIGS. 3A and 3B are figures for explaining the installation state of the acceleration sensor.
Figure 3B:
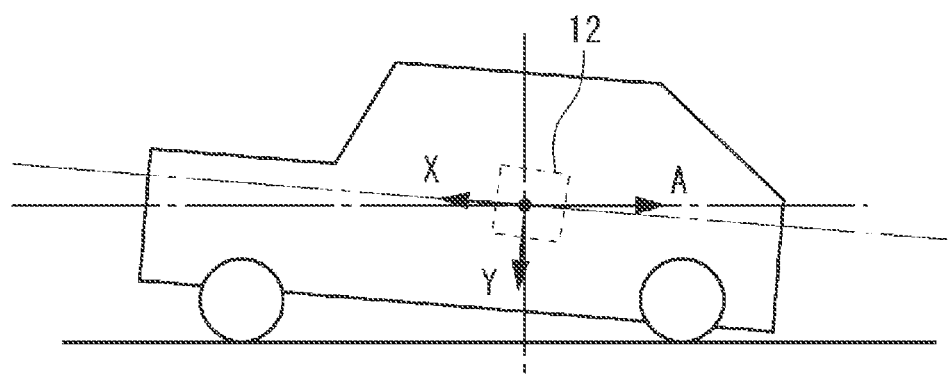

FIGS. 3A and 3B are figures for explaining the installation state of the acceleration sensor. As shown in FIG. 3A, in the present embodiment, in order to simplify the description, it is assumed that the acceleration sensor 12 is disposed so that the axial direction of the X axis which is the first axis of the acceleration sensor 12 matches the front-to-rear direction (the horizontal direction) of the vehicle, and the axial direction of the Y axis which is the second axis of the acceleration sensor 12 matches the up-and-down direction (the vertical direction) of the vehicle. Also, the vector denoted by A in FIG. 3A indicates the acceleration in the direction of travel of the vehicle which is hereinafter referred to as "vehicle traveling direction acceleration A".

Figure 4:
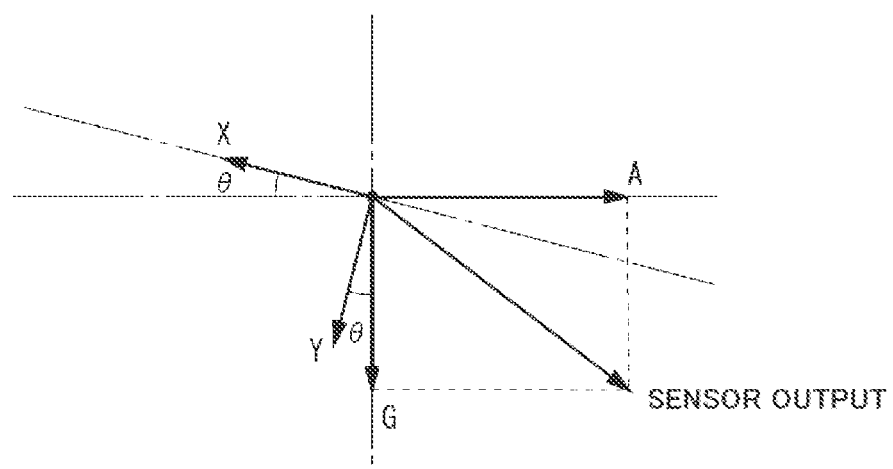
FIG. 4 is an enlarged view showing the relationship between each axis of the acceleration sensor and the acceleration in the direction of vehicle travel.

FIG. 3B shows the state of the vehicle attitude change where the rear portion of the vehicle relatively moves downward and the front portion relatively moves upward due to the influence of the occupant, cargo or the like. (In the figure, the traveling direction is from the right to the left of the page.) In this case, while the vehicle is traveling, as shown in the figure, the X axis and the Y axis of the acceleration sensor 12 are inclined as the attitude of the vehicle changes, but the direction of the vehicle traveling direction acceleration A does not incline and remains parallel to the road surface on which the vehicle is positioned. FIG. 4 shows this relationship in an enlarged manner. As shown in the figure, the angle θ formed between the direction parallel to the road surface and the front-to-rear direction of the vehicle corresponds to the attitude angle of the vehicle. This relationship applies not only to a road where its surface is horizontal, but also where its surface is inclined which is not shown in the figure.

As shown in FIG. 4, the sensor output by the acceleration sensor 12 is a composite vector of the vehicle traveling direction acceleration A and the gravitational acceleration G. Here, the X axis and Y axis components of this sensor output can be expressed as follows.

$X = -G \sin θ - A \cos θ$ $Y = +G \cos θ - A \sin θ$

By eliminating the gravitational acceleration G component from each of the above-described X axis and Y axis components and defining each component as $X_A$ and $Y_A$ respectively, these $X_A$ and $Y_A$ can be expressed as follows.

$X_A = -A \cos θ$ $Y_A = -A \sin θ$

Thus, the vehicle traveling direction acceleration A can be expressed as follows. It should be noted that, in the following equation, SQRT(z) represents the square root of z where z is a real positive.

$A = SQRT(X_A^2 + Y_A^2)$

Further, the angle θ can be expressed as follows using the vehicle traveling direction acceleration A and the Y axis component $Y_A$ of the sensor output from which the gravitational acceleration component has been eliminated.

$\sin θ = Y_A / A$

Thus, the angle θ can be expressed as follows using the arc sine function.

$θ = \arcsin(Y_A / A)$

Figure 5:
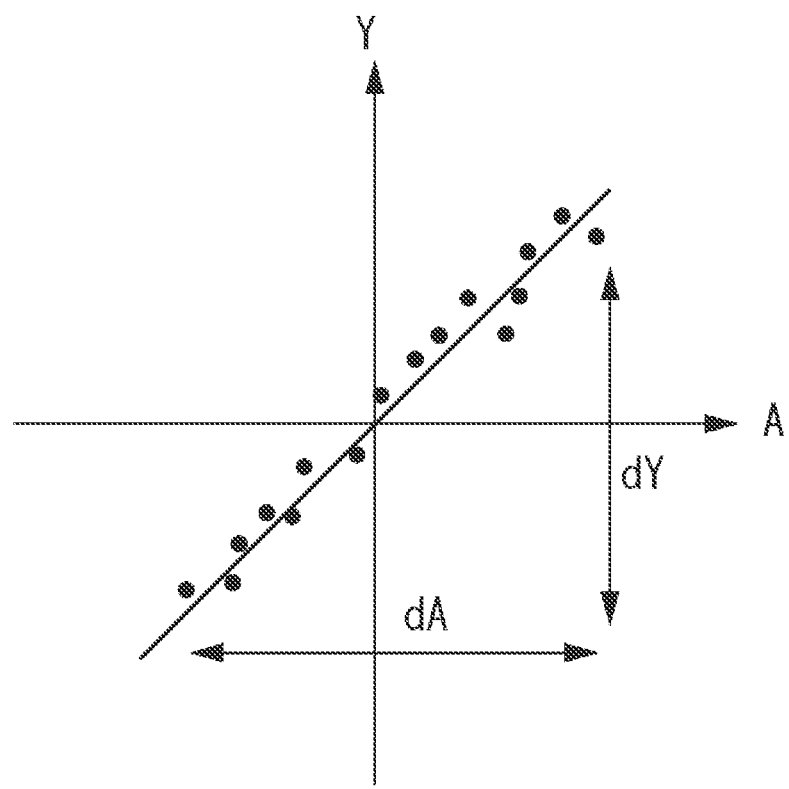
FIG. 5 is a graph for explaining the contents of statistical processing performed by the angle calculation part.

From the above, for example, as shown in FIG. 5, when the vehicle traveling direction acceleration A is represented on the first axis and the Y axis component $Y_A$ of the sensor output from which the gravitational acceleration component has been eliminated is represented on the second axis, based on the gradient ($Y_A/A$) of the straight line indicating the relationship between A and $Y_A$, the angle θ can be obtained. Here, instead of obtaining the angle θ based on the gradient of the straight line indicating the relationship between A and $Y_A$ using linear approximation, by calculating the ratio of $Y_A$ and A ($Y_A/A$) for each plotted value and the angle θ based on the ratio, and further calculating the average value of the multiple of the angles θ corresponding to each of the plotted values, the angle θ can also be obtained by setting this average angle value as the angle θ.

In the vehicle lighting system of the present embodiment, based on the sensor output of the acceleration sensor 12, according to a predetermined calculation formula, the gravitational components $X_g$, $Y_g$ of the gravitational acceleration G in each of the X axis and the Y axis are calculated in advance, and by using these calculated $X_g$ and $Y_g$, the gravitational acceleration component is respectively eliminated (subtracted) from the X and Y axis components of the sensor output of the acceleration sensor 12. Then, based on the respective components $X_A$, $Y_A$ from which the gravitational component has been eliminated, by using the above-stated calculation formula, the vehicle traveling direction acceleration A is calculated, and based on the vehicle traveling direction acceleration A and the Y axis component $Y_A$ from which the gravity component has been eliminated, the angle θ is obtained from the above-stated calculation formula, and the optical axis adjustment is performed based on this angle θ. Hereinafter, this operation will be described with reference to a flowchart.

Figure 6:
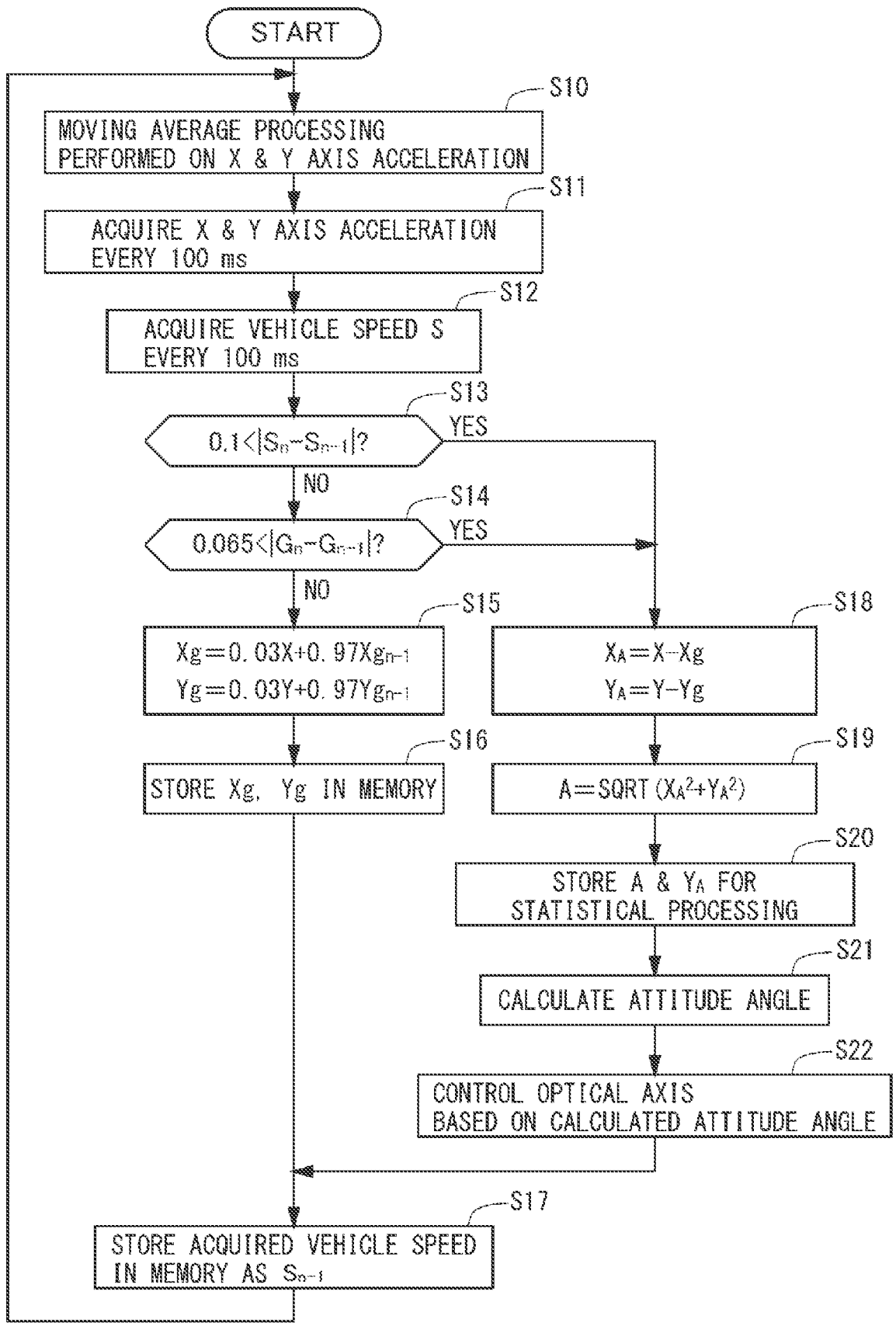
FIG. 6 is a flowchart for explaining the operation of the vehicular lamp system.

FIG. 6 is a flowchart for explaining the operation of the vehicular lamp system. Here, processing contents of the control part 11 is mainly shown. Further, the sequence of each processing block shown here may be changed as long as no inconsistency occurs among them.

The angle calculation part 20 acquires the X, Y axis acceleration values outputted from the acceleration sensor 12 and performs moving average processing on these values (step S10). For example, the X, Y axis acceleration values outputted from the acceleration sensor 12 are acquired every 1 ms (millisecond), and moving average processing is performed on these values.

Further, every 100 ms, the angle calculation part 20 acquires each of X, Y axis acceleration values obtained by the moving average processing (step S11), and further acquires the vehicle speed S every 100 ms from the vehicle speed sensor (not shown) installed in the vehicle (step S12). Here, the time interval 100 ms for acquiring each acceleration value and vehicle speed is an example, and is not limited thereto. The time interval for acquiring each acceleration value and the vehicle speed may be different.

Next, the angle calculation part 20 determines whether or not the absolute value of the difference between the current vehicle speed $S_n$ and the immediately preceding value of the current vehicle speed $S_{n-1}$ ($|S_n - S_{n-1}|$) exceeds a predetermined reference value, for example, 0.1 km/h (step S13). Here, if the difference ($S_n - S_{n-1}$) is a positive value, then vehicle acceleration is assumed, and if the difference is a negative value, then vehicle deceleration is assumed. When the absolute value of the difference is equal to or less than the reference value, the change in the vehicle speed is small and the vehicle is considered to be in a stable state, whereas when the absolute value of the difference is larger than the reference value, the change of the vehicle speed is large and the vehicle is considered to be in an accelerating or a decelerating state.

When the absolute value of the difference $|S_n - S_{n-1}|$ is equal to or smaller than the predetermined reference value (step S13, NO), the angle calculating part 20 further determines whether or not the absolute value of $|G_n - G_{n-1}|$ the difference between the current acceleration $G_n$ and the immediately preceding value of the current acceleration $G_{n-1}$ is greater than a predetermined reference value (0.065 m/s$^2$ as an example) (step S14). The absolute value $|G_n - G_{n-1}|$ of the acceleration difference here can also be obtained by calculating $SQRT(X_n^2 + Y_n^2) - SQRT(X_{n-1}^2 + Y_{n-1}^2)$, for example. Here, the absolute value $|G_n - G_{n-1}|$ of the acceleration difference may be set as $SQRT(X_n^2 - X_{n-1}^2)$ on the assumption that the obtained acceleration of the X direction approximately matches the acceleration in the front to rear direction of the vehicle. Further, regarding the determination in step S14, each of the differences of the accelerations in the X direction and the Y direction $SQRT(X_n^2 - X_{n-1}^2)$, $SQRT(Y_n^2 - Y_{n-1}^2)$ may be obtained, reference values corresponding to each of the differences may be set (for example, 0.065 m/s$^2$ for the former, 0.05 m/s$^2$ for the latter), and when the difference between at least one of the accelerations is larger than the corresponding reference value, an affirmative determination may be made.

When the absolute value of the difference $|G_n - G_{n-1}|$ is equal to or less than the reference value (step S14, NO), according to the calculation formulas shown below, the angle calculation part 20 calculates the gravitational components Xg, Yg of the gravitational acceleration G in each of the X axis and the Y axis of the acceleration sensor 12 (step S15).

$$Xg = 0.03X + 0.97 Xg_{n-1}$$

$$Yg = 0.03Y + 0.97 Yg_{n-1}$$

Here, $Xg_{n-1}$, $Yg_{n-1}$ represent the calculated values immediately preceding the current gravitational components Xg, Yg.

Further, when the vehicle is actually traveling on the road, even if the vehicle speed change (fluctuation) is 0.1 km/h or less, due to a slight acceleration change, vibration, or the like, a component other than the gravitational component (a noise component) is inevitably contained in the acceleration sensor 12 output signal. When performing the statistical processing to be described later using the signal containing the noise component, this component adversely affects the calculation of the angle of inclination. Therefore, it is desirable to eliminate this excessive noise component which is referred to as "G value" in this specification. In the present embodiment, by using a predetermined coefficient a, the component corresponding to the G value is eliminated. As an example, the predetermined coefficient a is set to 0.03 and the coefficients used for $Xg_{n-1}$ and $Yg_{n-1}$ are set to (1-a). The numerical value of the coefficient a is determined based on experimental results. The coefficient a may be changed according to the value of the difference ($S_n - S_{n-1}$). For example, when the value of the difference is 0.05 km/h to 0.1 km/h, the coefficient may be set to 0.02. The numerical value of the coefficient a can be set variably between 0.01 and 0.04, for example, such that the coefficient a becomes smaller as the difference decreases.

Next, the angle calculation part 20 stores the calculated gravitational components Xg, Yg in a memory medium (not shown) (step S16), and stores the value of the vehicle speed acquired in step S12 in the memory medium as the vehicle speed $S_{n-1}$ (step S17).

On the other hand, when the absolute value of the difference $|S_n - S_{n-1}|$ is larger than the reference value (step S13, YES) or when the value of the above stated difference $|G_n - G_{n-1}|$ is larger than the reference value (step S14, YES), by using the calculation formulas shown below, the angle calculation part 20 calculates the respective components $X_A$, $Y_A$ from which the gravitational component has been eliminated (step S18).

$$X_A = X - Xg$$

$$Y_A = Y - Yg$$

Next, in accordance with the calculation formula shown below, the angle calculation part 20 calculates the vehicle traveling direction acceleration A using each of the calculated components $X_A$, $Y_A$ (step S19).

$$A = SQRT(X_A^2 + Y_A^2)$$

Next, the angle calculation part 20 stores the Y axis component $Y_A$ from which the gravitational component has been eliminated and the vehicle traveling direction acceleration A in a buffer for statistical processing (step S20).

Next, the angle calculation part 20 calculates the attitude angle of the vehicle using the Y axis component $Y_A$ and the vehicle traveling direction acceleration A which were stored in the buffer (step S21). Specifically, for example, the respective values of the Y axis component $Y_A$ and the vehicle traveling direction acceleration A are plotted on a coordinate plane (refer to FIG. 5), and their relationship is linearly approximated to obtain the gradient ($Y_A/A$), and further, by using this gradient, in accordance with the calculation formula shown below, the angle θ is obtained.

$$\theta = \arcsin(Y_A/A)$$

When the attitude angle θ of the vehicle is calculated, based on this attitude angle θ, the optical axis setting part 21 in the control part 11 generates a control signal for controlling the optical axis of each lamp unit 13 and outputs it to each lamp unit 13 (step S22). In each lamp unit 13, the optical axis adjusting part 22 adjusts the optical axis based on the control signal provided from the optical axis setting part 21. Thereafter, the process moves to step S17, and the subsequent processes are repeated.

According to the above-described embodiment, it is possible to achieve a more accurate control technique for a vehicular lamp system capable of obtaining the attitude of the vehicle in the pitch direction.

Specifically, as in the above-described prior art (Patent Document 2), when using the plotted acceleration values of the horizontal and the vertical direction of the vehicle, the vector direction of the vehicle traveling direction acceleration A can be obtained, but the scalar value of the vehicle traveling direction acceleration A is unknown. As a result, the scalar value of the acceleration does not contribute to the calculation of the angle θ regardless of the magnitude of its value, and the effect of the error due to the existence of the gravity component is large when a weak acceleration is applied to the vehicle thereby decreasing the calculation accuracy of the angle θ. On the contrary, in the present embodiment, the gravity component is eliminated from the acceleration values to obtain the angle θ. Here, based on linear approximation such as the least squares method where numerical values deviated from the majority of sample ranges has a relatively strong effect on its outcome, in the present embodiment, by taking in account the scalar value of the acceleration, even when a strong vehicle traveling direction acceleration A is applied, it can be plotted within the majority of sample ranges thereby improving the calculation accuracy of the angle θ.

Further, in the present embodiment, since the angle θ is calculated based on the relationship between the vehicle traveling direction acceleration A and one of the axes of the acceleration sensor 12 (the Y axis), when the initial position of the acceleration sensor 12 is known, there is no need to respectively match the axial acceleration direction of the X axis and the Y axis of the sensor to the front-to-rear direction and the up-and-down direction of the vehicle. Therefore, installing the acceleration sensor to the vehicle can be carried out without requiring high installation accuracy, and while reducing the overall installation cost, the attitude angle of the vehicle can be obtained.

Furthermore, in the present embodiment, since the system determines whether or not the vehicle speed can be regarded as a constant speed based on the vehicle speed differences and further on the acceleration differences, it is possible to accurately determine the state of the vehicle, and from this viewpoint, it is also possible to further improve the calculation accuracy of the angle θ.

It should be noted that this invention is not limited to the subject matter of the foregoing embodiment, and can be implemented by being variously modified within the scope of the present invention as defined by the appended claims. For example, in the above-described embodiment, a case have been exemplified where the axial direction of the X axis of the acceleration sensor 12 matches the front-to-rear direction of the vehicle and the the axial direction of Y axis of the acceleration sensor 12 matches the up-and-down direction of the vehicle. However, since the X axis and the Y axis of the sensor may be arranged to be inclined from the front-to-rear direction and the up-and-down direction of the vehicle, the installation of the sensor is not limited to the vehicle body and may be installed inside the lamp unit or the control part assembly as well. According to the present invention, even if there is a variation in the mounting direction of the acceleration sensor with respect to the vehicle, the attitude angle can be obtained. Therefore, even in the case where the acceleration sensor is installed inside the lamp unit which is mounted onto the vehicle, since the vehicle traveling direction acceleration is calculated using the signal from the vehicle speed sensor, it is possible to calculate the attitude angle of the vehicle without being affected by the variation in the mounting direction of the acceleration sensor. In addition, if the acceleration sensor is integrally built into the lamp unit, the control part, or the like, then it becomes unnecessary to individually install the acceleration sensor to the vehicle body thereby reducing the installation work, and cost reduction can be achieved.

Further, in the above-stated embodiment, the X axis may be used instead of the Y axis as one of the axes of the acceleration sensor 12. In such a case, the angle θ can be obtained as follows using the vehicle traveling direction acceleration A and the X axis component $X_A$ of the sensor output from which the gravitational acceleration component has been eliminated.

$$\theta = \arccos(X_A/A)$$

Further, in the above-stated embodiment, although both values of the two axes of the acceleration sensor 12 are used when the system determines the acceleration change in step S14, only one of the values, the X axis value for example, may be used to determine the acceleration change. Further, it is possible to simply determine the acceleration change by using the combined X axis value and Y axis value without considering the gravitational acceleration component. Further, when the system determines whether or not the vehicle speed can be regarded as a constant speed, the determination based on the vehicle speed difference in step S13 may be omitted and only the determination based on the acceleration difference may be performed.

Further, in the above-described embodiment, the direction of the light source of each lamp unit is adjusted by an actuator, but the optical axis adjustment method is not limited thereto. For example, in a case where the light source of the lamp unit has a configuration in which a plurality of light-emitting elements are arranged in a matrix, by moving up and down the row of the light-emitting elements to be emitted according to the attitude angle, automatic leveling control can be achieved.

What is claimed is:

1. A control device for a vehicular lamp which variably controls optical axis of the vehicular lamp in accordance with an attitude change in the pitch direction of a vehicle comprising:

an angle calculation part,
wherein the angle calculation part obtains acceleration values each associated with the vertical direction and the horizontal direction of the vehicle at a predetermined time interval, and obtains a first acceleration value related to the vertical direction of the vehicle and a second acceleration value related to the horizontal direction of the vehicle by eliminating gravitational acceleration component from each of the acceleration values,
wherein the angle calculation part calculates a vehicle traveling direction acceleration based on the first acceleration value and the second acceleration value, and further obtains an attitude angle of the vehicle based on a correlation between either one of the first acceleration value or the second acceleration value and the vehicle traveling direction acceleration, and an optical axis setting part which generates a control signal for controlling the optical axis of the vehicular lamp based on the attitude angle of the vehicle obtained by the angle calculation part, and provides the control signal to the vehicular lamp, and wherein, before obtaining the attitude angle of the vehicle, the angle calculation part performs a first determination process that determines whether or not the vehicle is accelerating or decelerating by comparing either (i) the amount of change in one of each of the acceleration values at the predetermined time, (ii) the amount of change in the combined value of each of the acceleration values at the predetermined time, or (iii) the amount of change in the value obtained by eliminating the combined value of the gravitational acceleration component from the combined value of each of the acceleration values at a predetermined time, with a reference value corresponding to the selected amount of change, and obtains an attitude angle of the vehicle when the angle calculation part determines that the vehicle is accelerating or decelerating based on the first determination process, wherein the angle calculation part is configured to eliminate a gravitational acceleration component from each of the first acceleration value and second acceleration value, by calculating the second acceleration value and the first acceleration value with gravitational acceleration component removed as follows:

$$X_A = -A \cos \theta; \text{ and}$$

$$Y_A = -A \sin \theta$$

where $X_A$ is the second acceleration value with the gravitational component removed, $Y_A$ is the first acceleration value with the gravitational component removed, and A is the vehicle traveling direction acceleration.

2. The control device for a vehicular lamp according to claim 1, wherein, before performing the first determination process, the angle calculation part performs a second determination process that determines whether or not the vehicle is accelerating or decelerating by comparing vehicle speed difference at the predetermined time with the corresponding reference value, and further performs the first determination process when the angle calculation part determines that the vehicle is accelerating or decelerating based on the second determination process.

3. The control device for a vehicular lamp according to claim 1, wherein the angle calculation part calculates a gradient of the straight line obtained by performing a linear approximation based on the correlation between either one of the first acceleration value or the second acceleration value and the vehicle traveling direction acceleration, and obtains an attitude angle of the vehicle based on the gradient of the straight line.

4. The control device for a vehicular lamp according to claim 2, wherein the angle calculation part calculates a gradient of the straight line obtained by performing a linear approximation based on the correlation between either one of the first acceleration value or the second acceleration value and the vehicle traveling direction acceleration, and obtains an attitude angle of the vehicle based on the gradient of the straight line.

5. The control device for a vehicular lamp according to claim 3, wherein the angle calculation part obtains the attitude angle of the vehicle based on inverse sine function of the gradient of the straight line.

6. The control device for a vehicular lamp according to claim 4, wherein the angle calculation part obtains the attitude angle of the vehicle based on inverse sine function of the gradient of the straight line.

7. The control device for a vehicular lamp according to claim 1, wherein the acceleration values each associated with the vertical direction and the horizontal direction of the vehicle are detected by an acceleration sensor.

8. The control device for a vehicular lamp according to claim 2, wherein the acceleration values each associated with the vertical direction and the horizontal direction of the vehicle are detected by an acceleration sensor.

9. The control device for a vehicular lamp according to claim 3, wherein the acceleration values each associated with the vertical direction and the horizontal direction of the vehicle are detected by an acceleration sensor.

10. The control device for a vehicular lamp according to claim 4, wherein the acceleration values each associated with the vertical direction and the horizontal direction of the vehicle are detected by an acceleration sensor.

11. The control device for a vehicular lamp according to claim 1, wherein the vehicle traveling direction acceleration is obtained by squaring each of the first acceleration value and the second acceleration value and calculating the square root of the sum of the values obtained.

12. The control device for a vehicular lamp according to claim 2, wherein the vehicle traveling direction acceleration is obtained by squaring each of the first acceleration value and the second acceleration value and calculating the square root of the sum of the values obtained.

13. The control device for a vehicular lamp according to claim 3, wherein the vehicle traveling direction acceleration is obtained by squaring each of the first acceleration value and the second acceleration value and calculating the square root of the sum of the values obtained.

14. The control device for a vehicular lamp according to claim 4, wherein the vehicle traveling direction acceleration is obtained by squaring each of the first acceleration value and the second acceleration value and calculating the square root of the sum of the values obtained.

15. The control device for a vehicular lamp according to claim 1, wherein the gravitational acceleration component is obtained by performing a predetermined calculation using the acceleration values each associated with the vertical direction and the horizontal direction of the vehicle.

16. The control device for a vehicular lamp according to claim 2, wherein the gravitational acceleration component is obtained by performing a predetermined calculation using the acceleration values each associated with the vertical direction and the horizontal direction of the vehicle.

17. The control device for a vehicular lamp according to claim 3,
wherein the gravitational acceleration component is obtained by performing a predetermined calculation using the acceleration values each associated with the vertical direction and the horizontal direction of the vehicle.

18. The control device for a vehicular lamp according to claim 4,
wherein the gravitational acceleration component is obtained by performing a predetermined calculation using the acceleration values each associated with the vertical direction and the horizontal direction of the vehicle.

19. A vehicular lamp system including a control device according to claim 1 and a vehicle lamp controlled by the control device.

20. A vehicular lamp system including a control device according to claim 2 and a vehicle lamp controlled by the control device.

21. The control device for a vehicular lamp according to claim 1, wherein the angle calculation part is configured to calculate the vehicle traveling direction acceleration A as follows:

$$A = SQRT(X_A^2 + Y_A^2), \text{ and}$$

the angle calculation part is configured to calculate the attitude angle of the vehicle θ as follows:

$$\theta = \arcsin(Y_A/A), \text{ wherein}$$

the optical axis setting part generates the control signal for controlling the optical axis of the vehicular lamp based on the attitude angle θ of the vehicle obtained by the angle calculation part and controls the optical axis of the vehicular lamp based on the attitude angle θ.

* * * * *